United States Patent
Chiou et al.

(10) Patent No.: US 8,331,894 B2
(45) Date of Patent: Dec. 11, 2012

(54) METHOD FOR PERFORMING ACTIVE JAMMER SUPPRESSION ON ELECTRONIC DEVICE, AND ASSOCIATED APPARATUS

(75) Inventors: Hsien-Chyi Chiou, Hsinchu (TW); Chieh-Chao Liu, Hsinchu (TW); Yu-Chi Yeh, Taipei (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 1004 days.

(21) Appl. No.: 12/352,611

(22) Filed: Jan. 13, 2009

(65) Prior Publication Data

US 2010/0178874 A1    Jul. 15, 2010

(51) Int. Cl.
*H04B 1/10* (2006.01)
(52) U.S. Cl. ...................................... 455/296; 455/63.1
(58) Field of Classification Search .................. 455/296, 455/63.1; 342/16
See application file for complete search history.

(56) References Cited

U.S. PATENT DOCUMENTS

| | | | |
|---|---|---|---|
| 5,574,978 A | 11/1996 | Talwar et al. | |
| 5,974,301 A | 10/1999 | Palmer et al. | |
| 5,995,567 A | 11/1999 | Cioffi et al. | |
| 6,169,912 B1 | 1/2001 | Zuckerman | |
| 6,567,649 B2 | 5/2003 | Souissi | |
| 7,123,676 B2 | 10/2006 | Gebara et al. | |
| 2007/0184782 A1 | 8/2007 | Sahota | |
| 2008/0157863 A1 | 7/2008 | Hatanaka et al. | |
| 2010/0265116 A1* | 10/2010 | Kasperkovitz et al. | 342/16 |

FOREIGN PATENT DOCUMENTS

WO    2008066968 A2    6/2008

* cited by examiner

*Primary Examiner* — Lewis West
(74) *Attorney, Agent, or Firm* — Winston Hsu; Scott Margo

(57) ABSTRACT

A method for performing active jammer suppression on an electronic device includes: performing down conversion on a received signal having in-band interference, in order to obtain at least one down-converted received signal; performing down conversion on a jammer signal derived from a jammer source causing the in-band interference, in order to obtain at least one down-converted jammer signal; adjusting a phase and/or an amplitude of the down-converted jammer signal to obtain a jammer suppression signal; and performing jammer suppression according to the down-converted received signal and the jammer suppression signal. An apparatus for performing the active jammer suppression on the electronic device includes a received-signal down converter, at least one jammer down converter, and at least one adjustment module. In particular, the adjustment module is arranged to iteratively adjust the phase and/or the amplitude of the down-converted jammer signal to obtain an optimal version of the jammer suppression signal.

22 Claims, 6 Drawing Sheets

METHOD FOR PERFORMING ACTIVE JAMMER SUPPRESSION ON ELECTRONIC DEVICE, AND ASSOCIATED APPARATUS

BACKGROUND

The present invention relates to signal processing of electronic devices, and more particularly, to a method for performing active jammer suppression on an electronic device such as a Global Navigation Satellite System (GNSS) receiver, and to an associated apparatus.

One of the most important issues related to GNSS receivers is how to suppress interference. Typically, in a situation where GNSS signals are extremely weak, they can be below a noise level and are easily corrupted by interference. As a result, unrecoverable errors may occur in such a situation.

In particular, interference that comes from a harmonic frequency of a system clock (e.g. a CPU clock, or a pixel clock of a liquid crystal display module (LCM)) may fall within a GNSS band, causing in-band interference. According to the related art, a conventional passive suppression method that inserts a band-pass filter such as a surface acoustic wave (SAW) filter between an antenna and a low noise amplifier (LNA) of a GNSS receiver can only suppress out-of-band interference, rather than in-band interference.

Please note that adding the SAW filter does not help much on suppressing in-band interference since in-band interference often falls within a pass-band of the SAW filter. Thus, a novel method is required for suppressing in-band interference.

SUMMARY

An exemplary embodiment of a method for performing active jammer suppression on an electronic device comprises: performing down conversion on a received signal having in-band interference, in order to obtain at least one down-converted received signal; performing down conversion on a jammer signal derived from a jammer source causing the in-band interference, in order to obtain at least one down-converted jammer signal; adjusting a phase and/or an amplitude of the down-converted jammer signal to obtain a jammer suppression signal; and performing jammer suppression according to the down-converted received signal and the jammer suppression signal.

An exemplary embodiment of an apparatus for performing active jammer suppression on an electronic device comprises a received-signal down converter, at least one jammer down converter, and at least one adjustment module. The received-signal down converter is arranged to perform down conversion on a received signal having in-band interference, in order to obtain at least one down-converted received signal. The jammer down converter is arranged to perform down conversion on a jammer signal derived from a jammer source causing the in-band interference, in order to obtain at least one down-converted jammer signal. In addition, the adjustment module is arranged to adjust a phase and/or an amplitude of the down-converted jammer signal to obtain a jammer suppression signal. Additionally, the apparatus is arranged to perform jammer suppression according to the down-converted received signal and the jammer suppression signal.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
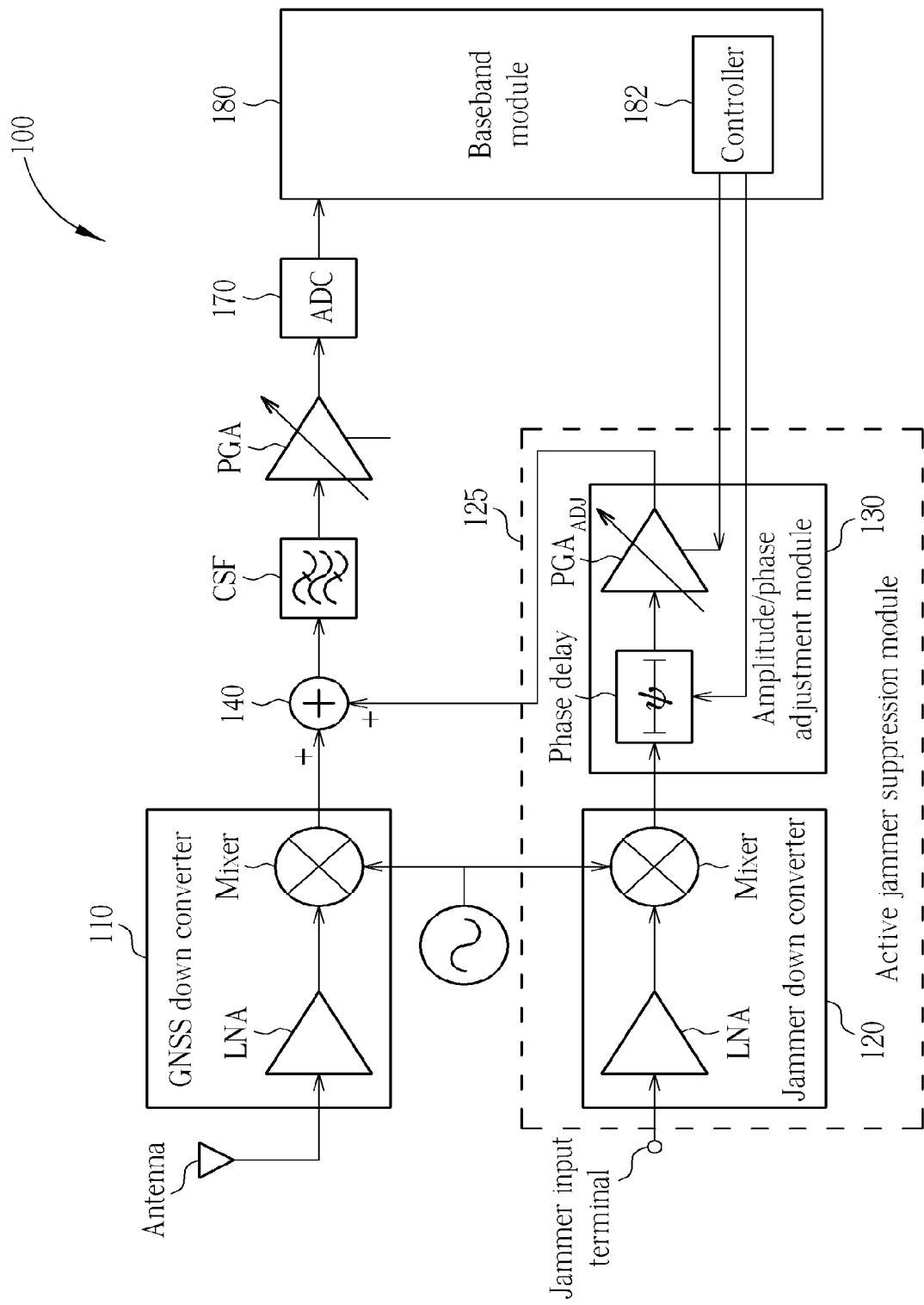
FIG. 1 is a diagram of an apparatus for performing active jammer suppression on an electronic device such as a Global Navigation Satellite System (GNSS) receiver according to a first embodiment of the present invention.

Please refer to FIG. 1, which illustrates a diagram of an apparatus 100 for performing active jammer suppression on an electronic device such as a Global Navigation Satellite System (GNSS) receiver according to a first embodiment of the present invention. The apparatus 100 comprises a received-signal down converter such as a GNSS down converter 110, at least one active jammer suppression module such as an active jammer suppression module 125, an arithmetic unit 140, a channel selection filter (labeled "CSF"), a programmable gain amplifier (labeled "PGA"), an analog-to-digital converter (ADC) 170, and a baseband module 180 comprising a controller 182. In addition, each of the at least one active jammer suppression module comprises a jammer down converter and an adjustment module. That is, the apparatus 100 comprises at least one jammer down converter and at least one adjustment module. In this embodiment, the active jammer suppression module 125 comprises a jammer down converter 120 and an adjustment module such as an amplitude/phase adjustment module 130.

As shown in FIG. 1, the amplitude/phase adjustment module 130 of this embodiment comprises a phase delay unit (labeled "Phase delay") and a programmable gain amplifier (labeled "$PGA_{ADJ}$"), where the controller 182 is arranged to control both the phase delay unit and the programmable gain amplifier $PGA_{ADJ}$. In addition, the GNSS down converter 110 of this embodiment comprises a low noise amplifier (LNA) electronically connected to an antenna and further comprises a single mixer, while the jammer down converter 120 of this embodiment comprises an LNA electronically connected to a jammer input terminal of the apparatus 100 and further comprises a single mixer. This is for illustrative purposes only, and is not meant to be a limitation of the present invention. According to a variation of this embodiment, the GNSS down converter 110 may comprise a plurality of mixers such as two mixers respectively corresponding to an I-path and a Q-path split from a signal path of the GNSS down converter 110, while the jammer down converter 120 may comprise a plurality of mixers such as two mixers respectively corresponding to an I-path and a Q-path split from a signal path of the jammer down converter 120. In this variation, one or more portions of the apparatus 100 may be varied in response to the split paths.

Please note that the input terminals of the arithmetic unit 140 are labeled "+", which represents the arithmetic unit 140 is arranged to sum up non-inverted input signals from the input terminals thereof. This is for illustrative purposes only, and is not meant to be a limitation of the present invention. According to a variation of this embodiment, the input terminals of the arithmetic unit 140 are respectively labeled "+" and "−", which represents the arithmetic unit 140 is arranged to calculate a difference between the input signals from the input terminals thereof. More particularly, in this variation, the arithmetic unit 140 is arranged to calculate the difference by summing up a non-inverted input signal (i.e. one of the input signals) and an inverted input signal (i.e. an inverted version of the other of the input signals).

In addition, various modifications may be applied to the apparatus 100 shown in FIG. 1. As a result, the apparatus 100 may represent the GNSS receiver in one embodiment of the present invention. In another embodiment of the present invention, the apparatus 100 may represent a portion of the GNSS receiver: for example, a circuit implemented with one or more chips. In another embodiment of the present invention, the apparatus 100 may comprise the GNSS receiver. For example, the apparatus 100 can be a multi-function device comprising a cellular phone function, a personal digital assistant (PDA) function, and the GNSS receiver function.

Figure 2:
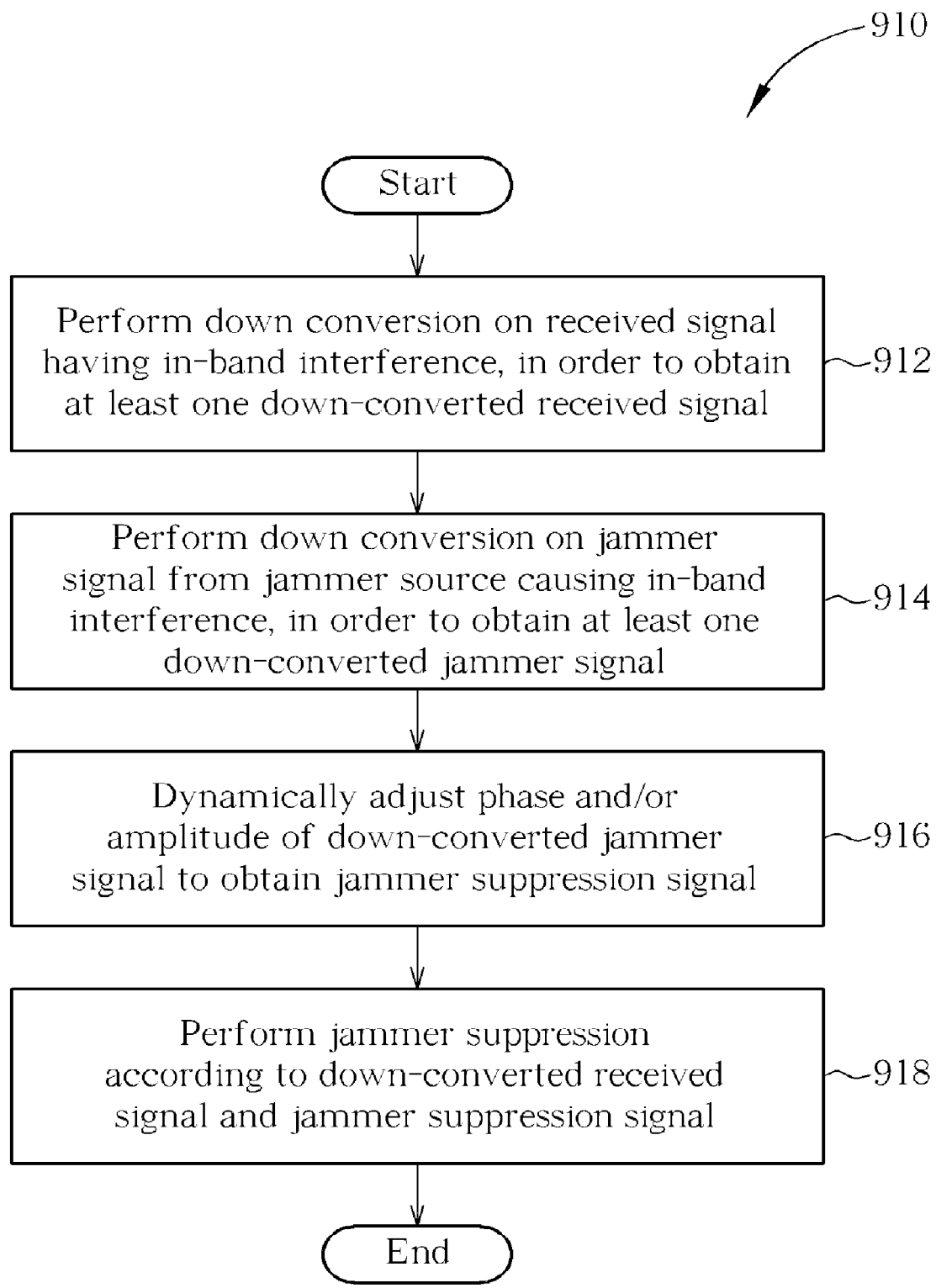
FIG. 2 is a flowchart of a method for performing active jammer suppression on an electronic device such as a GNSS receiver according to one embodiment of the present invention.

FIG. 2 is a flowchart of a method 910 for performing active jammer suppression on an electronic device such as a GNSS receiver according to one embodiment of the present invention. The method shown in FIG. 2 can be applied to the apparatus 100. In addition, the method shown in FIG. 2 can be implemented by utilizing the apparatus 100. The method 910 is described as follows.

In Step 912, the GNSS down converter 110 is arranged to perform down conversion on a received signal having in-band interference, in order to obtain at least one down-converted received signal. In this embodiment, the received signal represents a GNSS signal. Thus, in Step 912, the GNSS down converter 110 is arranged to perform down conversion on the GNSS signal having in-band interference, in order to obtain at least one down-converted GNSS signal. For example, the GNSS down converter 110 of this embodiment comprises only one mixer arranged to obtain a down-converted GNSS signal. This is for illustrative purposes only, and is not meant to be a limitation of the present invention. According to a variation of this embodiment, the GNSS down converter 110 may comprise a plurality of mixers such as two mixers arranged to obtain two down-converted GNSS signals respectively corresponding to an I-path and a Q-path split from the aforementioned signal path of the GNSS down converter 110.

In Step 914, the jammer down converter 120 is arranged to perform down conversion on a jammer signal derived from a jammer source causing the in-band interference, in order to obtain at least one down-converted jammer signal. For example, the jammer down converter 120 of this embodiment comprises only one mixer arranged to obtain a down-converted jammer signal. This is for illustrative purposes only, and is not meant to be a limitation of the present invention. According to a variation of this embodiment, such as that mentioned in Step 912, the jammer down converter 120 may comprise a plurality of mixers such as two mixers arranged to obtain two down-converted jammer signals respectively corresponding to an I-path and a Q-path split from the aforementioned signal path of the jammer down converter 120.

In practice, the jammer input terminal of the apparatus 100 is arranged to derive the jammer signal mentioned above from the jammer source via a direct connection to the jammer source or indirect coupling by using an antenna, which picks up the radiated interference of multiple jammer sources. And more specifically, the jammer input terminal of the apparatus 100 is arranged to derive the jammer signal from the jammer source via a direct connection between the jammer source and the jammer input terminal. For example, the jammer source represents a clock source for generating a system clock (e.g. the CPU clock mentioned above), the jammer signal represents the system clock, and the jammer input terminal is electronically connected to the clock source for generating the system clock. This is for illustrative purposes only, and is not meant to be a limitation of the present invention. According to a variation of this embodiment, the in-band interference is caused by a plurality of jammer sources (e.g. the CPU clock and the aforementioned pixel clock of the LCM), and the apparatus 100 comprises a plurality of active jammer suppression modules arranged to perform active jammer suppression for the jammer sources, respectively. In this variation, each of the active jammer suppression modules comprises one of the at least one jammer down converter and one of the at least one adjustment module. In addition, the active jammer suppression modules of this variation are electronically connected to the jammer sources via associated jammer input terminals of the apparatus 100, respectively.

In Step 916, the aforementioned adjustment module such as the amplitude/phase adjustment module 130 is arranged to adjust a phase and/or an amplitude of the down-converted jammer signal to obtain a jammer suppression signal. More particularly, the amplitude/phase adjustment module 130 adjusts the phase and the amplitude of the down-converted jammer signal to obtain the jammer suppression signal.

In Step 918, the apparatus 100 is arranged to perform jammer suppression according to the down-converted received signal and the jammer suppression signal. In this embodiment, the down-converted received signal represents the down-converted GNSS signal. That is, in Step 918, the apparatus 100 is arranged to perform jammer suppression according to the down-converted GNSS signal and the jammer suppression signal. In practice, the arithmetic unit 140 is arranged to perform a linear combination operation on the down-converted GNSS signal and the jammer suppression signal. This is for illustrative purposes only, and is not meant to be a limitation of the present invention. According to a variation of this embodiment, the apparatus 100 further comprises at least one filter (e.g. a single filter, or a plurality of filters) arranged to convert the down-converted GNSS signal into a filtered version of the down-converted GNSS signal, where the arithmetic unit 140 is arranged to perform a linear combination operation on the filtered version of the down-converted GNSS signal and the jammer suppression signal.

According to another variation of this embodiment, the apparatus 100 comprises at least one filter (e.g. a single filter, or a plurality of filters) arranged to convert the down-converted GNSS signal into a filtered version of the down-converted GNSS signal, and further comprises at least one filter (e.g. a single filter, or a plurality of filters) arranged to convert the jammer suppression signal into a filtered version of the jammer suppression signal, where the arithmetic unit 140 is arranged to perform a linear combination operation on the filtered version of the down-converted GNSS signal and the filtered version of the jammer suppression signal.

According to another variation of this embodiment, the apparatus 100 further comprises at least one filter (e.g. a single filter, or a plurality of filters) arranged to convert the jammer suppression signal into a filtered version of the jammer suppression signal, where the arithmetic unit 140 is arranged to perform a linear combination operation on the down-converted GNSS signal and the filtered version of the jammer suppression signal.

Figure 3:
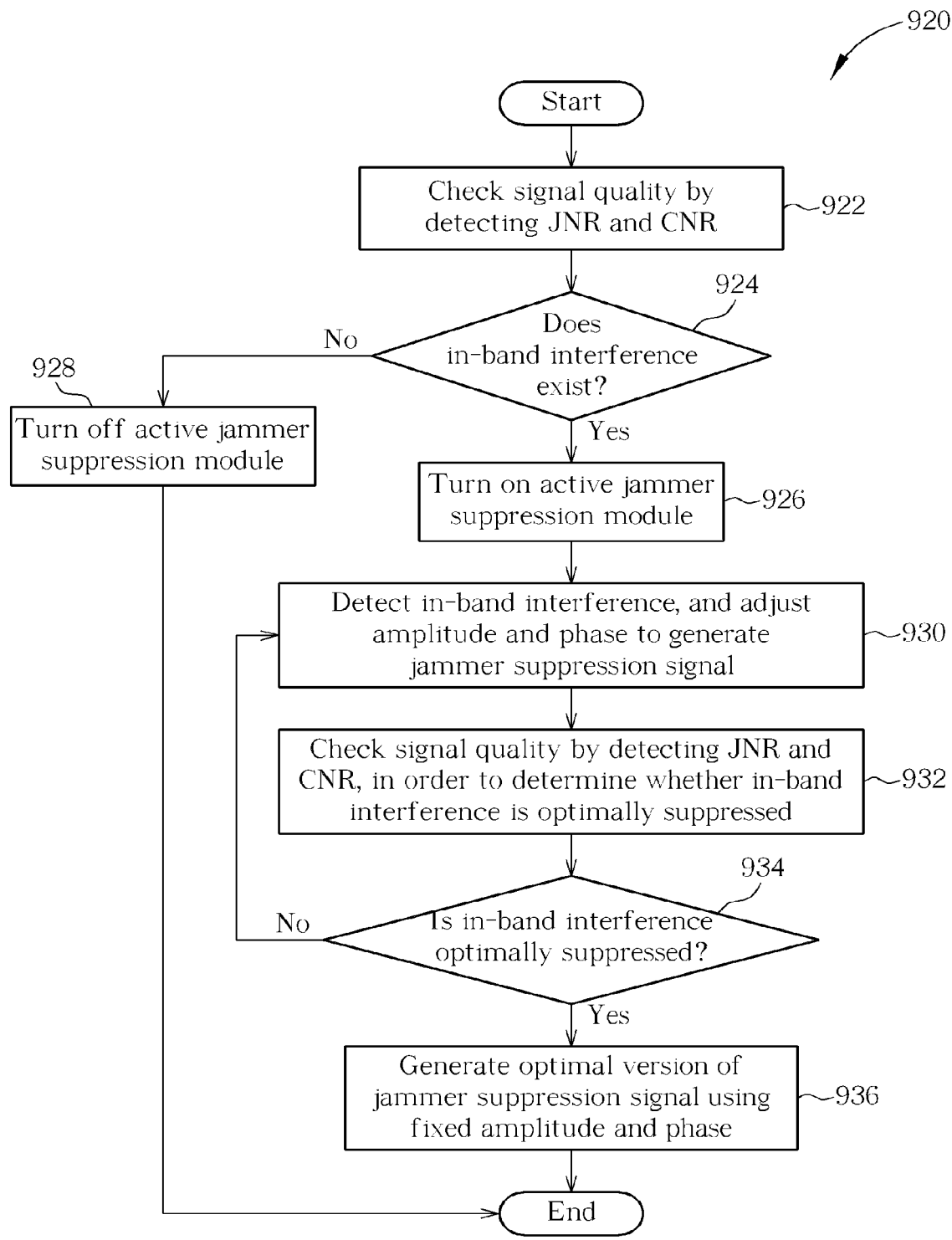
FIG. 3 illustrates an exemplary working flow of the method shown in FIG. 2 according to an embodiment of the present invention.

FIG. 3 illustrates an exemplary working flow 920 of the method 910 shown in FIG. 2 according to an embodiment of the present invention. In this embodiment, the adjustment module such as the amplitude/phase adjustment module 130 is arranged to iteratively adjust the phase and/or the amplitude of the down-converted jammer signal to obtain an optimal version of the jammer suppression signal. In particular, the amplitude/phase adjustment module 130 iteratively adjusts the phase and the amplitude of the down-converted jammer signal to obtain the optimal version of the jammer suppression signal. In addition, the apparatus 100 is arranged to perform jammer suppression according to the down-converted GNSS signal and the optimal version of the jammer suppression signal. The working flow 920 is described as follows.

In Step 922, the controller 182 checks the signal quality of the GNSS signal by detecting a jammer-to-noise ratio (JNR) and a carrier-to-noise ratio (CNR).

In Step 924, the controller 182 determines whether in-band interference exists. More particularly, the controller 182 determines whether in-band interference exists according to one or more detected results obtained in Step 922. When it is determined that the in-band interference exists, Step 926 is entered; otherwise, Step 928 is entered.

In Step 926, the controller 182 turns on the active jammer suppression module 125 shown in FIG. 1.

In Step 928, the controller 182 turns off the active jammer suppression module 125 shown in FIG. 1.

In Step 930, the controller 182 detects the in-band interference, and adjusts the amplitude and the phase to generate the jammer suppression signal. More particularly, under the loop control of the controller 182, Step 930 can be re-entered one or more times when needed. As a result, the controller 182 is capable of detecting the in-band interference and adjusting the amplitude and the phase to optimize the jammer suppression signal, iteratively.

In Step 932, the controller 182 checks the signal quality of the GNSS signal by detecting the JNR and the CNR, in order to determine whether the in-band interference is optimally suppressed.

In Step 934, when it is determined that the in-band interference is optimally suppressed, Step 936 is entered; otherwise, Step 930 is entered.

In Step 936, the controller 182 generates the optimal version of the jammer suppression signal using fixed amplitude and phase. More particularly, the controller 182 derives the fixed value of the amplitude and the fixed value of the phase from the iteration(s) of the loop comprising Step 930, Step 932, and Step 934, and controls the phase delay unit and the programmable gain amplifier $PGA_{ADJ}$ according to the fixed value of the phase and the fixed value of the amplitude, respectively.

Figure 4:
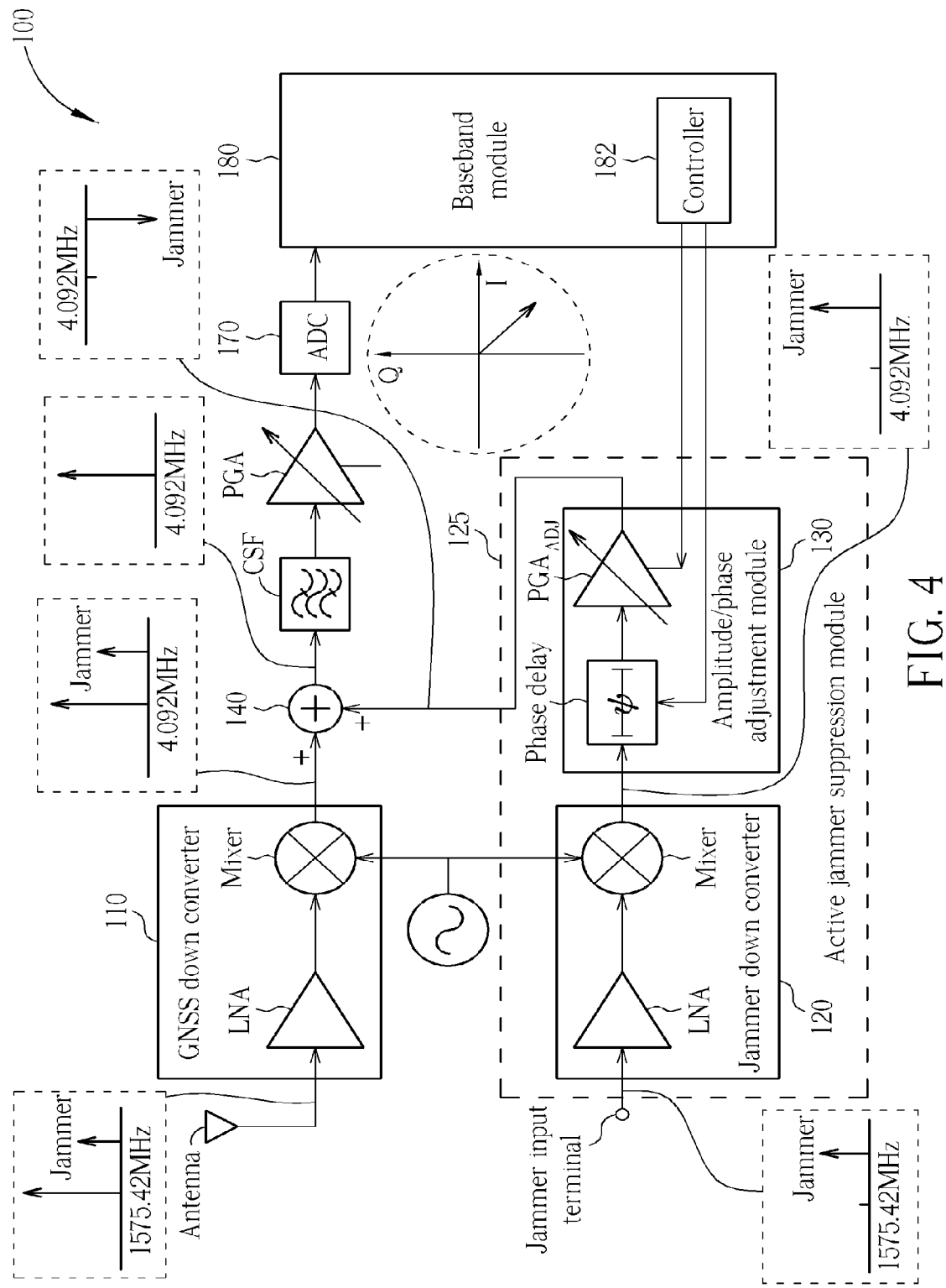
FIG. 4 illustrates exemplary frequency domain representations of some signals of the apparatus shown in FIG. 1 when an optimal version of a jammer suppression signal is obtained according to the embodiment shown in FIG. 3.

FIG. 4 illustrates exemplary frequency domain representations of some signals of the apparatus 100 shown in FIG. 1 when the optimal version of the jammer suppression signal is obtained according to the embodiment shown in FIG. 3.

The maximum spur of the upper-left frequency domain representation represents the GNSS signal in a situation where the GNSS signal is carried by a carrier having a frequency of 1575.42 MHz, and the notation "Jammer" in this frequency domain representation represents the in-band interference caused by the jammer source. As a result of executing Step 912, the GNSS down converter 110 outputs the down-converted GNSS signal. The frequency domain representation corresponding to the output of the GNSS down converter 110 represents the down-converted GNSS signal in a situation where the GNSS signal is down-converted from the frequency of 1575.42 MHz to a frequency of 4.092 MHz. Please note that the in-band interference is also down-converted with the same frequency shift (4.092 MHz-1575.42 MHz) as shown in this frequency domain representation.

In addition, the notation "Jammer" in the lower-left frequency domain representation represents the jammer signal. As a result of executing Step 914, the jammer down converter 120 outputs the down-converted jammer signal. The frequency domain representation corresponding to the output of the jammer down converter 120 represents the down-converted jammer signal in a situation where the jammer signal is down-converted with the same frequency shift (4.092 MHz-1575.42 MHz) as shown in this frequency domain representation.

As a result of executing Step 916, the aforementioned adjustment module such as the amplitude/phase adjustment module 130 outputs the jammer suppression signal. The frequency domain representation corresponding to the output of the amplitude/phase adjustment module 130 represents the jammer suppression signal, where an I-Q diagram corresponding to the output of the amplitude/phase adjustment module 130 means that the controller 182 adjusts the jammer suppression signal to have an equal amplitude and an opposite phase of the down-converted jammer signal, compared on the I-Q diagram. This frequency domain representation shows that the optimal version of the jammer suppression signal is obtained through the iteration(s) mentioned above. Therefore, the frequency domain representation corresponding to the output of the arithmetic unit 140 shows that the apparatus 100 successfully cancels the in-band interference.

Figure 5:
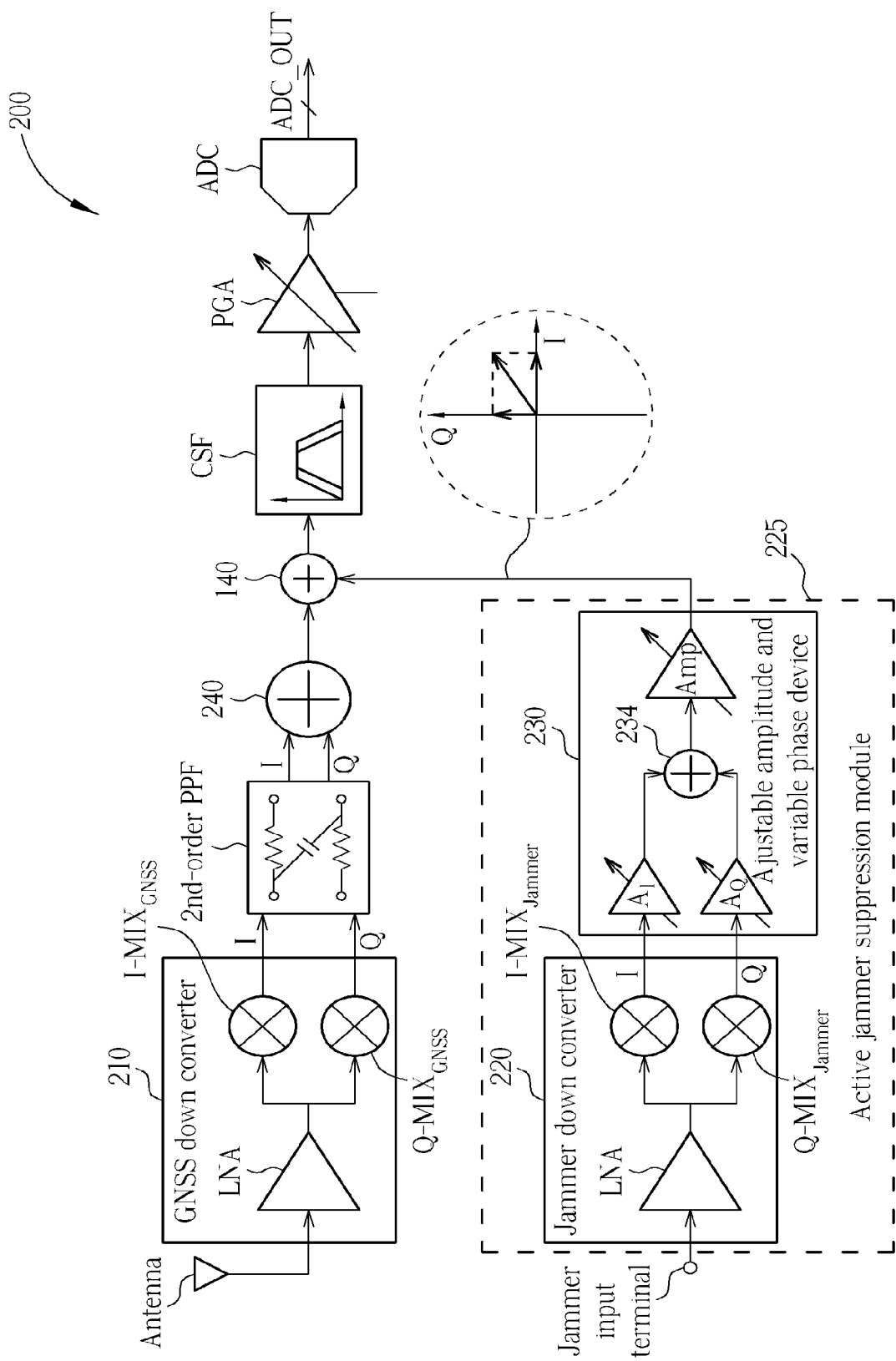
FIG. 5 is a diagram of an apparatus for performing active jammer suppression on an electronic device such as a GNSS receiver according to a second embodiment of the present invention.

FIG. 5 is a diagram of an apparatus 200 for performing active jammer suppression on an electronic device such as a GNSS receiver according to a second embodiment of the present invention. This embodiment is a variation of the first embodiment. Differences between the second embodiment and the first embodiment are described as follows.

In this embodiment, the notations "I" and "Q" are respectively utilized for representing the associate I-path and Q-path within a set of signal paths. The GNSS down converter 110 mentioned above is replaced by a GNSS down converter 210 comprising a plurality of mixers such as two mixers I-MIX$_{GNSS}$ and Q-MIX$_{GNSS}$. The at least one down-converted GNSS signal mentioned Step 912 comprises an I-path down-converted GNSS signal and a Q-path down-converted GNSS signal, and a phase difference between the I-path down-converted GNSS signal and the Q-path down-converted GNSS signal is equivalent to 90 degrees.

As shown in FIG. 5, the aforementioned active jammer suppression module 125 is replaced by an active jammer suppression module 225. More specifically, the jammer down converter 120 mentioned above is replaced by a jammer down converter 220 comprising a plurality of mixers such as two mixers I-MIX$_{Jammer}$ and Q-MIX$_{Jammer}$. The at least one down-converted jammer signal mentioned Step 914 comprises an I-path down-converted jammer signal and a Q-path down-converted jammer signal, and a phase difference between the I-path down-converted jammer signal and the Q-path down-converted jammer signal is equivalent to 90 degrees.

In addition, the amplitude/phase adjustment module 130 is replaced by an amplitude/phase adjustment module 230 that can be utilized for achieving the same objective of obtaining the jammer suppression signal, and more particularly, the objective of obtaining the optimal version of the jammer suppression signal. In practice, the amplitude/phase adjustment module 230 is arranged to perform a linear combination operation on an amplitude of the I-path down-converted jammer signal and an amplitude of the Q-path down-converted jammer signal to obtain the jammer suppression signal. More particularly, the operations of the amplitude/phase adjustment module 230 are controlled by the controller 182 of this embodiment.

As shown in FIG. 5, the amplitude/phase adjustment module 230 comprises an I-path variable gain amplifier (labeled "$A_I$"), a Q-path variable gain amplifier (labeled "$A_Q$"), an arithmetic unit 234, and another variable gain amplifier (labeled "Amp"). The I-path variable gain amplifier $A_I$ is arranged to adjust the amplitude of the I-path down-converted jammer signal, and the Q-path variable gain amplifier $A_Q$ is arranged to adjust the amplitude of the Q-path down-converted jammer signal. Additionally, the arithmetic unit 234 is arranged to sum up the adjusted versions of the I-path down-converted jammer signal and the Q-path down-converted jammer signal, in order to obtain a synthesized jammer signal representing a combination of the I-path passing through the I-path variable gain amplifier $A_I$ and the Q-path passing through the Q-path variable gain amplifier $A_Q$. The variable gain amplifier Amp adjusts an amplitude of the synthesized jammer signal to obtain the jammer suppression signal.

According to this embodiment, the apparatus 200 further comprises at least one filter (i.e. one or more filters). For example, the apparatus 200 of this embodiment further comprises a plurality of filters, such as a second-order poly phase filter (labeled "2nd-order PPF") and an arithmetic unit 240. The second-order poly phase filter is arranged to convert the down-converted GNSS signals into respective filtered versions of the down-converted GNSS signals. In particular, the second-order poly phase filter is arranged to perform second-order poly phase filtering on the down-converted GNSS signals. The arithmetic unit 240 is arranged to sum up the filtered versions of the down-converted GNSS signals, in order to obtain a synthesized GNSS signal representing a combination of the I-path passing through the mixer I-MIX$_{GNSS}$ and the Q-path passing through the mixer Q-MIX$_{GNSS}$. Thus, the arithmetic unit 140 is arranged to perform a linear combination operation on the synthesized GNSS signal (i.e. a resultant filtered version of the down-converted GNSS signals in this embodiment) and the jammer suppression signal. The ADC output (labeled "ADC_OUT") of the ADC is sent to the baseband module 180 of this embodiment. Similar descriptions for this embodiment are not repeated in detail here.

As mentioned, the arithmetic unit 234 of this embodiment is arranged to sum up the adjusted versions of the I-path down-converted jammer signal and the Q-path down-converted jammer signal, in order to obtain the synthesized jammer signal. This is for illustrative purposes only, and is not meant to be a limitation of the present invention. According to a variation of this embodiment, the arithmetic unit 234 of this embodiment is arranged to calculate a difference between the adjusted versions of the I-path down-converted jammer signal and the Q-path down-converted jammer signal, in order to obtain the synthesized jammer signal. For example, the I-path input terminal and the Q-path input terminal of the arithmetic unit 234 can be labeled "+" and "−", respectively. In another example, the I-path input terminal and the Q-path input terminal of the arithmetic unit 234 can be labeled "−" and "+", respectively. According to another variation of this embodiment, the I-path input terminal and the Q-path input terminal of the arithmetic unit 234 can be labeled "−" and "−", respectively.

According to another variation of this embodiment, the controller 182 is capable of dynamically switching the inverted/non-inverted statuses of the I-path input terminal and the Q-path input terminal of the arithmetic unit 234, in order to control the phase of the jammer suppression signal on an I-Q diagram. Under the control of the controller 182 of this variation, the inverted/non-inverted statuses of the I-path input terminal and the Q-path input terminal can be ("+", "+") (i.e., the I-path input terminal and the Q-path input terminal are in their non-inverted statuses, respectively), ("+", "−") (i.e., the I-path input terminal is in its non-inverted status and the Q-path input terminal is in its inverted status), ("−", "+") (i.e., the I-path input terminal is in its inverted status and the Q-path input terminal is in its non-inverted status), or ("−", "−") (i.e., the I-path input terminal and the Q-path input terminal are in their inverted statuses, respectively).

Figure 6:
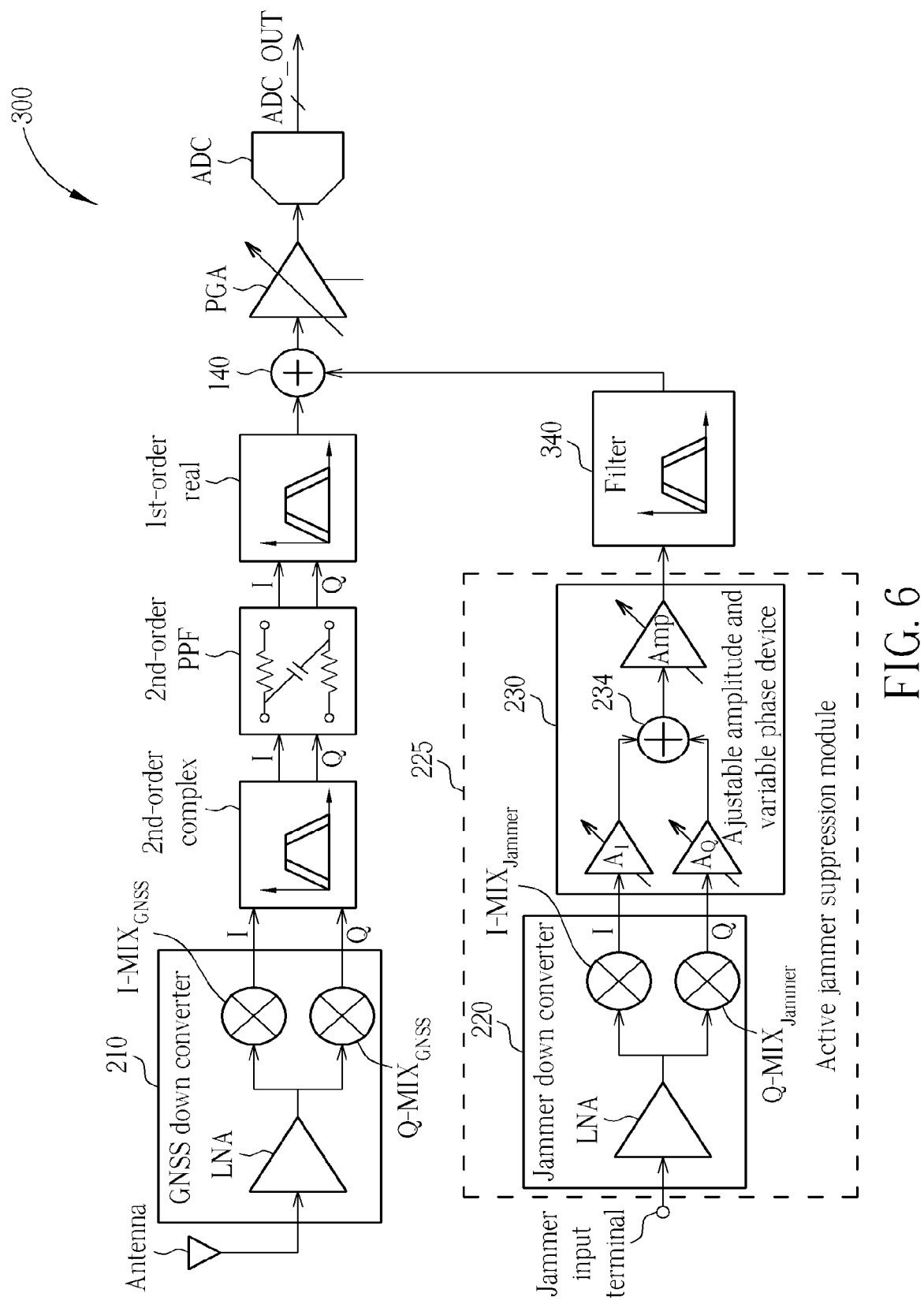
FIG. 6 is a diagram of an apparatus for performing active jammer suppression on an electronic device such as a GNSS receiver according to a third embodiment of the present invention.

FIG. 6 is a diagram of an apparatus 300 for performing active jammer suppression on an electronic device such as a GNSS receiver according to a third embodiment of the present invention. This embodiment is a variation of the second embodiment. Differences between the third embodiment and the second embodiment are described as follows.

In this embodiment, a filter such as a second-order complex unit (labeled "2nd-order complex") is inserted between the second-order poly phase filter (labeled "2nd-order PPF") and the mixers I-MIX$_{GNSS}$ and Q-MIX$_{GNSS}$, and another filter such as a first-order real unit (labeled "1st-order real") is inserted between the second-order poly phase filter and the arithmetic unit 140, where the aforementioned channel selection filter (labeled "CSF") is removed. Please note that the purposes of inserting the first-order real unit comprise filtering and combining the I-path passing through the mixer I-MIX$_{GNSS}$ and the Q-path passing through the mixer Q-MIX$_{GNSS}$. That is, the first-order real unit is also utilized as an adder.

In addition, another filter 340, such as a low pass filter or a band pass filter, is further inserted between the amplitude/phase adjustment module 230 and the arithmetic unit 140. Similar descriptions for this embodiment are not repeated in detail here.

In contrast to the related art, the present invention method and apparatus can actively generate the jammer suppression signal to suppress/cancel the in-band interference, rather than utilizing one or more passive filters to perform passive suppression.

It is another advantage of the present invention that the present invention method and apparatus can iteratively adjust the phase and the amplitude of the down-converted jammer signal to obtain the optimal version of the jammer suppression signal. Therefore, the result derived from the active jammer suppression that is implemented according to the present invention can be optimized.

It is another advantage of the present invention that the strategy of adjusting the phase and the amplitude of the down-converted jammer signal to obtain the optimal version of the jammer suppression signal brings easier design of vector modulator(s) and programmable gain amplifier(s), and can reduce power consumption.

Those skilled in the art will readily observe that numerous modifications and alterations of the device and method may be made while retaining the teachings of the invention.

What is claimed is:

1. A method for performing active jammer suppression on an electronic device, the method comprising:
    performing down conversion on a received signal having in-band interference, in order to obtain at least one down-converted received signal;
    performing down conversion on a jammer signal derived from a jammer source causing the in-band interference, in order to obtain at least one down-converted jammer signal;
    adjusting a phase and/or an amplitude of the down-converted jammer signal to obtain a jammer suppression signal; and
    performing jammer suppression according to the down-converted received signal and the jammer suppression signal.

2. The method of claim 1, further comprising:
    deriving the jammer signal from the jammer source via a direct connection to the jammer source or indirect coupling by antenna.

3. The method of claim 1, wherein the step of adjusting the phase and/or the amplitude of the down-converted jammer signal to obtain the jammer suppression signal further comprises:
    iteratively adjusting the phase and/or the amplitude of the down-converted jammer signal to obtain an optimal version of the jammer suppression signal;
    wherein the step of performing jammer suppression according to the down-converted received signal and the jammer suppression signal further comprises:
        performing jammer suppression according to the down-converted received signal and the optimal version of the jammer suppression signal.

4. The method of claim 1, wherein the at least one down-converted jammer signal comprises an I-path down-converted jammer signal and a Q-path down-converted jammer signal; and a phase difference between the I-path down-converted jammer signal and the Q-path down-converted jammer signal is equivalent to 90 degrees.

5. The method of claim 4, wherein the step of adjusting the phase and/or the amplitude of the down-converted jammer signal to obtain the jammer suppression signal further comprises:
    performing a linear combination operation on an amplitude of the I-path down-converted jammer signal and an amplitude of the Q-path down-converted jammer signal to obtain the jammer suppression signal.

6. The method of claim 5, wherein the step of adjusting the phase and/or the amplitude of the down-converted jammer signal to obtain the jammer suppression signal further comprises:
    adjusting the amplitude of the I-path down-converted jammer signal and the amplitude of the Q-path down-converted jammer signal.

7. The method of claim 1, wherein the step of performing jammer suppression according to the down-converted received signal and the jammer suppression signal further comprises:
    performing a linear combination operation on the down-converted received signal and the jammer suppression signal.

8. The method of claim 1, wherein the step of performing jammer suppression according to the down-converted received signal and the jammer suppression signal further comprises:
    performing a linear combination operation on a filtered version of the down-converted received signal and the jammer suppression signal.

9. The method of claim 1, wherein the step of performing jammer suppression according to the down-converted received signal and the jammer suppression signal further comprises:
    performing a linear combination operation on a filtered version of the down-converted received signal and a filtered version of the jammer suppression signal.

10. The method of claim 1, wherein the step of performing jammer suppression according to the down-converted received signal and the jammer suppression signal further comprises:
    performing a linear combination operation on the down-converted received signal and a filtered version of the jammer suppression signal.

11. The method of claim 1, wherein the in-band interference is caused by a plurality of jammer sources; and the method further comprises:
    performing active jammer suppression for the jammer sources, respectively.

12. An apparatus for performing active jammer suppression on an electronic device, the apparatus comprising:
    a received-signal down converter arranged to perform down conversion on a received signal having in-band interference, in order to obtain at least one down-converted received signal;
    at least one jammer down converter arranged to perform down conversion on a jammer signal derived from a jammer source causing the in-band interference, in order to obtain at least one down-converted jammer signal; and
    at least one adjustment module arranged to adjust a phase and/or an amplitude of the down-converted jammer signal to obtain a jammer suppression signal;
    wherein the apparatus is arranged to perform jammer suppression according to the down-converted received signal and the jammer suppression signal.

13. The apparatus of claim 12, wherein a jammer input terminal of the apparatus is arranged to derive the jammer signal from the jammer source via a direct connection between the jammer source and the jammer input terminal or indirect coupling by antenna.

14. The apparatus of claim 12, wherein the adjustment module is arranged to iteratively adjust the phase and/or the amplitude of the down-converted jammer signal to obtain an optimal version of the jammer suppression signal; and the apparatus is arranged to perform jammer suppression according to the down-converted received signal and the optimal version of the jammer suppression signal.

15. The apparatus of claim 12, wherein the at least one down-converted jammer signal comprises an I-path down-converted jammer signal and a Q-path down-converted jammer signal; and a phase difference between the I-path down-converted jammer signal and the Q-path down-converted jammer signal is equivalent to 90 degrees.

16. The apparatus of claim 15, wherein the adjustment module is arranged to perform a linear combination operation on an amplitude of the I-path down-converted jammer signal and an amplitude of the Q-path down-converted jammer signal to obtain the jammer suppression signal.

17. The apparatus of claim 16, wherein the adjustment module comprises:
an I-path variable gain amplifier arranged to adjust the amplitude of the I-path down-converted jammer signal; and
a Q-path variable gain amplifier arranged to adjust the amplitude of the Q-path down-converted jammer signal.

18. The apparatus of claim 12, further comprising:
an arithmetic unit arranged to perform a linear combination operation on the down-converted received signal and the jammer suppression signal.

19. The apparatus of claim 12, further comprising:
at least one filter arranged to convert the down-converted received signal into a filtered version of the down-converted received signal; and
an arithmetic unit arranged to perform a linear combination operation on the filtered version of the down-converted received signal and the jammer suppression signal.

20. The apparatus of claim 12, further comprising:
at least one filter arranged to convert the down-converted received signal into a filtered version of the down-converted received signal;
at least one filter arranged to convert the jammer suppression signal into a filtered version of the jammer suppression signal; and
an arithmetic unit arranged to perform a linear combination operation on the filtered version of the down-converted received signal and the filtered version of the jammer suppression signal.

21. The apparatus of claim 12, further comprising:
at least one filter arranged to convert the jammer suppression signal into a filtered version of the jammer suppression signal; and
an arithmetic unit arranged to perform a linear combination operation on the down-converted received signal and the filtered version of the jammer suppression signal.

22. The apparatus of claim 12, wherein the in-band interference is caused by a plurality of jammer sources; the apparatus comprises a plurality of active jammer suppression modules arranged to perform active jammer suppression for the jammer sources, respectively; and each of the active jammer suppression modules comprises one of the at least one jammer down converter and one of the at least one adjustment module.

* * * * *